United States Patent [19]

Auslander et al.

[11] Patent Number: 6,003,056
[45] Date of Patent: Dec. 14, 1999

[54] DIMENSIONLESS FAST FOURIER TRANSFORM METHOD AND APPARATUS

[76] Inventors: Lewis Auslander, 437 Manor Ridge Rd., Pelhem Manor, N.Y. 10803; Jeremy R. Johnson, 3 Robins La., Berwyn, Pa. 19312; Robert W. Johnson, 1529 Prairie Hill Rd., St. Cloud, Minn. 56301

[21] Appl. No.: 08/779,731

[22] Filed: Jan. 6, 1997

[51] Int. Cl.$^6$ .................................................. G06F 15/00
[52] U.S. Cl. ........................................... 708/404; 708/406
[58] Field of Search ........................ 364/725.01, 725.02, 364/725.03, 726.01, 726.02, 726.03–726.07, 727.01

[56] References Cited

U.S. PATENT DOCUMENTS

| | | | |
|---|---|---|---|
| 4,456,877 | 6/1984 | Brown | 324/76.36 |
| 4,858,164 | 8/1989 | Schildhorn | 364/736.03 |
| 5,293,330 | 3/1994 | Sayegh | 364/726.04 |
| 5,365,470 | 11/1994 | Smith | 364/726.04 |
| 5,724,278 | 3/1998 | Ohgose et al. | 364/725.02 |

OTHER PUBLICATIONS

Frontiers in Applied Mathematics; Computational Frameworks for the Fast Fourier Transform; Charles Van Loan; 1992 by the Society for Industrial and Applied Mathematics; (entire book, 273 pages).

How the FFT Gained Acceptance; James W. Cooley; Jan. 1992, IEEE SP Magazine, pp. 10–13.

Fast Fourier Transforms—For Fun and Profit; W.M. Gentleman; AFIPS Proceedings — Fall Joint Computer Conference, 1966, pp. 333–348.

Vector Radix Fast Fourier Transform; David B. Harris et al, 1977 IEEE Int. Conf. on Acoustics, Speech and Signal Processing, May 9–11, 1977, Hartford, Conn.; pp. 548–551.

Direct Fast Fourier Transform of Bivariate Functions; Glen E. Rivard; IEEE Transactions on Acoustics, Speech, and Signal Processing, vol. ASSP–25, No. 3, Jun. 1977, pp. 250–252.

A Unified Treatment of Cooley–Tukey Algorithms for the Evaluation of the Multidimensional DFT; Russell M. Mersereau, IEEE Transactions on Acoustics, Speech, and Signal Processing, vol. ASSP–29, No. 5, Oct. 1981; pp. 1011–1018.

Kronecker Products and Shuffle Algebra, Marc Davio; IEEE Transactions on Computers, vol. C–30, No. 2, Feb. 1981; pp. 116–125.

An Adaptation of the Fast Fourier Transform for Parallel Processing; Marshall C. Pease; Journal of the Association for Computing Machinery, vol. 15, No. 2, Apr. 1968, pp. 252–264.

Short Notes; The Relationship Between Two Fast Fourier Transforms; IEEE Transactions on Computers, Mar. 1971; pp. 310–317.

Al Algorithm for the Machine Calculation of Complex Fourier Series by James W. Cooley and John W. Tukey; Math, Comp. vol. 19, No. 90 (1965); pp. 297–301.

(List continued on next page.)

*Primary Examiner*—Emmanuel L. Moise
*Attorney, Agent, or Firm*—Merchant & Gould P.A.

[57] ABSTRACT

A method and apparatus for calculating fast Fourier transforms FFTs. An FFT of a given size is formatted using tensor product principles for implementation in apparatus or by software such that the same reconfigurable hardware or software can calculate FFTs of any dimension for the selected FFT size. The FFT is factored into an input permutation and successive stages for computing tensor products of dimensionless Fourier transforms of a relatively small base size and twiddle factors, with load-stride permutations between computation stages. The basic building blocks of the circuitry can be reconfigurable for maximizing use-flexibility of the hardware or software. Examples of digital circuit apparatus configured to compute dimensionless formatted FFTs are presented.

25 Claims, 11 Drawing Sheets

OTHER PUBLICATIONS

What is the Fast Fourier Transform?; William T. Cochran et al.; IEEE Transactions on Audio and Electroacoustics, vol. AU–15, No. 2, Jun. 1967; pp. 45–55.

Short Notes, On the Fast Fourier Transform on Finite Abelian Groups; Thomas W. Cairns; IEEE Transactions on Computers, May 1971, pp. 569–571.

On the Twiddling Factors; C.K. Yuen, IEEE Transactions on Computers, May 1973; pp. 544–545.

Properties of the Multidimensional Generalized Discrete Fourier Transform; Paolo Corsini and Graziano Frosini; IEEE Transactions on Computers, vol. c–28, No. 11, Nov. 1979; pp. 819–830.

Correspondence; A New Technique for Twiddle–Factor Elimination in Multidimensional FFT's; R. Bernardini et al.; IEEE Transactions on Signal Processing, vol. 42, No. 9, Aug. 1994; pp. 2176–2178.

The Structure of Vector Radix Fast Fourier Transforms; Hong Ren Wu and Frank John Paoloni; IEEE Transactions on Acoustics, Speech, and Signal Processing, vol. 37, No. 9, Sep. 1989; pp. 1415–1424.

Fast Hardware Fourier Transformation Through Counting; Shalhav Zohar; IEEE Transactions on Computers, vol., C–22, No. 5, May 1973; pp. 433–441.

A Pipeline Processor for Mixed–Size FFT's; Soheil I. Sayegh; IEEE Transactions on Signal Processing, vol. 40, No. 8, Aug. 1992; pp. 1892–1900.

A Bus–Oriented Multiprocessor Fast Fourier Transform; Douglas L. Jones and Henrik V. Sorensen, IEEE Transactions on Signal Processing, vol. 39, No. 11, Nov. 1991; pp. 2547–2551.

Access and Alignment of Data in an Array Processor; Duncan H. Lawrie; IEEE Truncations on Computers, vol. c–24, No. 12, Dec. 1975; pp. 1145–1155.

Fixed–Pipeline Two–Dimensional Hadamard Transform Algorithms; Chih–Peng Fan and Jar–Ferr Yang; IEEE Transactions on Signal Processing, vol. 45, No. 6, Jun. 1997; pp. 1669–1674.

Organization of Large Scale Fourier Processors; Marshall C. Pease; Journal of the Association for Computing Machinery, vol. 16, No. 3, Jul. 1969, pp. 474–482.

A Fast Fourier Transform for High–Speed Signal Processing; Michael H. Corinthios; IEEE Transactions on Computers, vol. c–20, No. 8, Aug. 1971; pp. 843–846.

Very Fast Fourier Transform Algorithms Hardware for Implementation; Alvin M. Depain; IEEE Transactions on Computers, vol. c–28, No. 5, May 1979; pp. 333–341.

A Parallel Radix–4 Fast Fourier Transform Computer; Michael J. Corinthios et al.; IEEE Transactions on Computers, vol. c–24, No. 1, Jan.; pp. 80–92.

On Generating Multipliers for a Cellular Fast Fourier Transform Processor; W.R. Cyre and G.J. Lipovski; IEEE Transactions on Computers, Jan. 1972; pp. 83–87.

A pipeline Fast Fourier Transform; Herbert L. Groginsky and George A. Works; IEEE Transactions on Computers, vol. c–19, No. 11, Nov. 1970; pp. 1015–1019.

Fourier Transform Computers Using CORDIC Iterations; Alvin M. Despain, IEEE Transactions on Computers, vol, c–23, No. 10, Oct. 1974; pp. 993–1001.

Constant Geometry Fast Fourier Transforms on Array Processors, George Miel; IEEE Transactions on Computers, vol. 42, No. 3, Mar. 1993; pp. 371–375.

Correspondence; Modular Architecture for High Performance Implementation of the FFT Algorithm, K. Sapiecha and R. Jarocki, IEEE Transactions on Computers, vol. 39, No. 12, Dec. 1990; pp. 1464–1468.

Pipeline and Parallel–Pipeline FFT Processors for VLSI Implementations; Erling H. Wold and Alvin M. Despain; IEEE Transactions on Computers, vol. c–33, No. 5, May 1984; pp. 414–425.

Fault–Tolerant FFT Networks; Jing–Yang Jou and Jacob A. Abraham; IEEE Transactions on Computers, vol. 37, No. 5, May 1988; pp. 548–561.

Parallelism in Fast Fourier Transform Hardware; Ben Gold and Theodore Bially; Copyright © 1973 by the Institute of Electrical and Electronics Engineers, Inc., Reprinted from IEEE Trans. Audio Electroacoustics, AU–21(1), 5–16 (1973); pp. 357–368.

Some New Realizations of Dedicated Hardware Digital Signal Processors; Abraham Peled and Bede Liu; pp. 171–175; Copyright © 1974 by the Institute of Electrical and Electronics Engineers, Inc., Reprinted from Proc. 1974 IEEE EASCON, Institute of Electrical and Electronics Engineers, Inc., 1974, pp. 464–468.

Fast Fourier Transform Hardware Implementations—A Survey; Glenn D. Bergland; IEEE Transactions on Audio and Electroacoustics, vol. Au–17, No. 2, Jun. 1969; pp. 109–119.

Architectures for Multiplierless Fast Fourier Transform Hardware Implementation in VLSI; Wirendre a. Perera; IEEE Transactions on Acoustics, Speech, and Signal Procesing, vol. ASSP–35, No. 12, Dec. 1987; pp. 1750–1760.

A New Hardware Realization of High–Speed Fast Fourier Transformers; Bede Liu and Abraham Peled; IEEE Transactions on Acoustics, Speech, and Signal Processing, vol. ASSP–23, No. 6, Dec. 1975; pp. 543–579.

An Architecture for a Video Rate Two–Dimensional Fast Fourier Transform Processor;; G.F. Taylor, R.H. Steinvorth and J.F. McDonald; IEEE Transactions on Computers, vol. 37, No. 9, Sep. 1988; pp. 1145–1148.

Parallel Processing with the Perfact Shuffle, Harold S. Stone; IEEE Transactions on Computers, vol. c–20, No. 2, Feb. 1971; pp. 153–161.

The Design of a Class of Fast Fourier Transform Computers, Michael J. Corinthios; IEEE Transactions on Computers, vol. c–20, No. 6, Jun. 1971; pp. 617–622.

Continuous Shading of Curved Surfaces, Henry Gouraud; IEEE Transactions on Computers, vol. c–20, No. 6, Jun. 1971; p. 623.

A VLSI Network for Variable Size FFT's; G. Bongiovanni; IEEE Transactions on Computers, vol. c–32, No. 8, Aug. 1983; pp. 756–760.

Notes on Shuffle/Exchange–Type Switching Networks; D. Stott Parker, Jr.; IEEE Transactions on Computers, vol. c–29, No. 3, Mar. 1980; pp. 213–222.

Fourier Transforms in VLSI; Clark D. Thompson; IEEE Transactions on Computers, vol. c–32, No. 11, Nov. 1983; pp. 1047–1057.

Multidimensional Cooley–Tukey Algorithms Revisited; Auslander et al.; (1996) Advances in Applied Mathematics, vol. 17, pp. 477–519; pp. 1–45.

Multilinear Algebra and Parallel Programming; R.W. Johnson et al.; The Journal of Supercomputing, No. 5, (1991); pp. 189–217.

A Methodology for Designing, Modifying, and Implementing Fourier Transform Algorithms on Various Architectures; J.R. Johnson et al.; Circuits Systems Signal Process, vol. 9, No. 4, 1990; pp. 449–500.

FFT Bibliography; J.R. Johnson and R. W. Johnson; Jul. 9, 1997; Unpublished.

DIMENSIONLESS FAST FOURIER TRANSFORM METHOD AND APPARATUS

FIELD OF THE INVENTION

This invention relates generally to fast Fourier transforms (FFTs) and more particularly to a unique formulation of the FFT in a dimensionless format and to techniques for implementing reconfigurable hardware for rapidly evaluating one-, two- or three-dimension Cooley-Tukey type FFTs.

BACKGROUND OF THE INVENTION

The well-known Fourier transform has and remains of fundamental importance in mathematical analysis and is the subject of volumes of study. It has been used for many years as an efficient computational tool for accomplishing certain common manipulations of data. For example, the Fourier transform may be used to approximate events or phenomena occurring in a two-dimensional plane as might be the case when performing signal processing translations of digital information into graphic or other visually perceivable intelligence. Practical applications for use of the Fourier transform are enormous in the digital signal processing arena. Further, other transform equations such as the Radon transform used in tomography are commonly converted to Fourier transform equations to facilitate their calculation.

Due to its linear nature, practical applicability of the basic Fourier transform has been limited due to the length of time required to derive meaningful calculation results for multi-dimensional Fourier transform equations. Until the mid 1960s, for a medium-sized Fourier transform having, for example a thousand points (n), a two-dimensional calculation using simple linear matrix multiplication calculation methods would require ($n^2$) or $10^6$ multiplications.

What is now known as the fast Fourier transform (FFT) algorithm became generally known in 1965 primarily through the efforts of J. W. Cooley and J. W. Tukey who published their findings in "An Algorithm for the Machine Calculation of Complex Fourier Series" Maths. Comp., 1990:297–301, April 1965. This paper is herein incorporated by reference to the extent that the teachings thereof are valuable to an understanding of this invention. The emergence of what has come to be known as the Cooley/Tukey or simply C-T FFT algorithm was a milestone in the history of computing. The FFT algorithm generally changed computation of the discrete Fourier transform from a linear ($n^2$) process to a logarithmic (n log n) calculation. The difference in calculation time was immense. For example, the $10^6$ calculations required by the Fourier transform example above reduces down to only approximately three thousand calculations using the FFT algorithm. Such reduction in the required number of calculations and the resultant increase in calculation speed has had a tremendous impact on the practicality of use and expanded uses for the FFT in digital signal processing applications. For example, signal processing using CD ROM's has become commonplace as a result of processing of the digital signals with FFT algorithms.

Since their inception, the C-T type FFT algorithms have predominated the art of Fourier transform calculations. Over the years, numerous variations of the C-T FFT algorithm have been posed, as for example, those discussed in the paper entitled "What Is The Fast Fourier Transform?" by W. T. Cochran; J. W. Cooley; D. L. Favin; H. D. Helms; R. A. Kaenal; W. W. Lang; G. G. C. Mailing, Jr.; D. E. Nelson; C. M. Rader; and P. D. Welch, (IEEE Trans. Audio Electroacoust., 15(2):45–55, June 1967), which is herein incorporated by reference.

The standard approaches or techniques for processing the C-T FFT-type algorithms have not changed much over the years. Typically, calculations involving one-dimensional FFTs are manageable, since the calculations can be rapidly continuously processed to a result. As the number of FFT dimensions increases, however, so does the time and difficulty in performing the calculations. For example, the typical method used to process the calculations of a two-dimensional FFT which can be presented in a matrix form, is to perform all of the calculations for each row of the matrix and to perform all of the calculations for each column of the matrix, and then perform the cross product (i.e., row and column) calculations by using parallel processing techniques. This approach is generally referred to as the "row-column" or "butterfly" approach. From an overall time perspective, the calculation time required for performing the individual row and column calculations is relatively small compared to the time required to perform the translation calculations between the parameters of rows versus columns. For multidimensional Fourier transforms, the processing is typically performed with parallel processors. As the size of the FFT matrix increases, the processing time involved dramatically increases and often is only attainable by the use of super computers.

As technology has advanced so have the applications for the Fourier transform and the need for rapidly calculating huge multidimensional Fourier transforms. If huge Fourier transforms, such as $10^6 \times 10^6$ point Fourier transforms could be rapidly calculated, many problems and practical applications for use of the Fourier transform in applied signal processing could be implemented that are not practical today. For example, in tomography, such processing speed reduction might enable pictures of a pumping heart to be obtained. Similar needs for reducing the time to obtain useful results from the processing of radar signals exist. It would be desirable to have a technique that would permit at least a one and possible two orders of magnitude decrease in the speed of processing complex (multidimensional) FFTs. It is also desirable that such technique be adaptable for implementation with existing semiconductor and computer technology. It is believed that the present invention will provide the key to achieving such techniques. Historically, there has not been much done to change the way FFT algorithms are perceived or written. This was due in large part to the success achieved by the butterfly techniques as a teaching and programming device. Other approaches to processing the C-T FFT algorithms, however, have been introduced. One of such approaches, which is important to this invention is the "tensor" product formulation of the FFT, which was first introduced in 1968 by M. C. Pease in an article entitled "An Adaptation of the Fast Fourier Transform for Parallel Processing" (J. Assoc. Compt. Mach 15(2):252–264 April 1968). The tensor product approach did not receive much attention until it was successfully programmed on vector computers such as the Cray X-MP and Cyber 205 computers by Temperton in the early 1980s. This invention incorporates the tensor product formulation principles in characterizing the FFT algorithms in a unique manner which enables the C-T FFT algorithm to be written in a "dimensionless" format that can be readily implemented in reconfigurable hardware for evaluating one-, two- or three-dimensional C-T FFTs in a manner that significantly reduces the processing time.

SUMMARY OF THE INVENTION

The present invention provides a method for formatting FFTs of a given size in a dimensionless manner such that the one-, two- or three-dimensional equivalents of the FFT can be implemented on the same hardware or with the same software with the use of relatively simple reconfiguration. The formatting process uses tensor product principles to factor the FFT in a manner that enables rapid evaluation or computation of data representing the FFT in successive computational stages. The dimensionless FFT format provides for an initial permutation of the input data, and successive stage computations of tensor products of dimensionless Fourier transforms of a relatively small base size and twiddle factor multiplications by complex numbers. Between successive stage computations the data is permuted by a load-stride permutation. The tensor product factoring formulation enables the FFT to be readily implemented with reconfigurable digital apparatus so that the same apparatus can be used to evaluate one-, two- or three-dimensional forms of the FFT. The invention also enables the digital apparatus to be reconfigurable such that the same apparatus can be reconfigured to process each stage of the computation. The invention can also be implemented through software operating on a digital computer.

Using the principles of this invention, time savings for computing the FFT of an order of magnitude or more over present day techniques is possible. Such time savings provides immense opportunities for enhancing present applications for FFTs and provides an opportunity for efficient calculation of very large size FFTs that will greatly expand the practical applications for FFT evaluation-based technology.

According to one aspect of the invention, there is provided a method for computing one-, two- or three-dimension FFTs comprising the steps of: (a) selecting an FFT of a known size to be computed; (b) formatting the FFT in dimensionless format; and (c) implementing the dimensionless formatted FFT for computation by a computing apparatus, wherein the implementation enables the FFT and its other dimensional equivalents to be calculated using the same basic implementation. The invention includes implementing the dimensionless formatted FFT in digital hardware or by configuring software operable on a digital computer. The digital hardware can include all levels of digital circuitry, from semiconductor computer chips to board-level circuitry, to full computer circuitry in systems. The method of formatting the FFT in dimensionless form includes factoring the selected FFT to include the following factors: (a) a first permutation; (b) at least one dimensionless Fourier transform of a base size; (c) at least one twiddle factor multiplication by a complex number or numbers; and (d) at least one load-stride permutation.

According to a further aspect of the invention, there is provided a method for computing one-, two- or three-dimension FFTs comprising the steps of: (a) selecting an FFT of a known size to be computed; (b) formatting the FFT in dimensionless format; and (c) computing the dimensionless formatted FFT on a computing apparatus.

According to yet a further aspect of the invention, there is provided a method of designing computing hardware to evaluate dimensionless FFTs comprising the steps of: (a) selecting an FFT that has been formatted in dimensionless format, to be evaluated; and (b) implementing the dimensionless formatted FFT for computation by a computing apparatus, wherein the implementation enables the FFT in any dimension to be calculated using the same basic implementation of the computing apparatus.

According to yet a further aspect of the invention, there is provided a method of computing data representing an FFT of size n, comprising: (a) inputting the data into a digital computing device; (b) permuting the data; (c) processing the data through a first computation stage comprising a tensor product of a dimensionless Fourier transform of base size m, where m is less than or equal to n, and a first twiddle factor; and (d) permuting the product of the first computation stage, to provide first stage output data. The process includes repeating the processing of the data from the first computation stage through successive computation stages until the dimensionless formatted FFT has been fully evaluated.

According to yet a further aspect of the invention, there is provided a computing apparatus for computing input data representative of an FFT of size n, comprising: (a) input permutation digital circuits for permuting the input data; and (b) stage processing digital circuits for successively multiplying tensor products of a base size Fourier transform and a twiddle factor, and permuting the multiplied product according to a dimensionless FFT format. Such computing apparatus further includes means for reconfiguring at least a portion of the stage processing digital circuits between successive multiplying steps during the computation of any FFT of size n. The invention further contemplates such a computing apparatus wherein the same input permutation digital circuits and stage processing digital circuits can be used for computing one-, two- or three-dimensional equivalents of the FFT of size n.

According to yet a further aspect of the invention, there is provided a computer-implemented method for evaluating an FFT of size n, comprising the steps of: (a) deriving a dimensionless FFT model of the FFT using a tensor-product formulation technique; and (b) using the dimensionless FFT model on data streams representing a specific FFT of size n to evaluate the data streams.

These and other aspects of the invention will become apparent to those skilled in the art upon a more detailed presentation of the inventive algorithm and techniques used for implementing hardware for processing the algorithm.

BRIEF DESCRIPTION OF THE DRAWING

Referring to the Drawing, wherein like numerals represent like parts throughout the several views:

FIG. 4, including FIGS. 4A and 4B, collectively illustrate a functional multipurpose block diagram of a hardware implemented apparatus for computing a size 64 fast Fourier transform of one, two or three dimensions;

FIG. 5, including

FIG. 6, including FIG. 7, including

DESCRIPTION OF THE PREFERRED EMBODIMENT

The present invention provides a unique approach to formulating C-T type FFTs which enables an FFT to be treated as a dimensionless entity. The dimensionless characterization of the FFT enables the implementation of basic computational building blocks in hardware in a manner such that the same reconfigurable hardware can be used to evaluate either one-, two- or three-dimensional C-T type FFTs. Proper formulation of the FFT is important to the invention. "Tensor" products described in the previously cited Pease paper offer a natural language for expressing C-T type FFT algorithms and are used in this invention. A fairly complete description of use of the tensor products with C-T FFTs is presented in a paper entitled "A Methodology for Designing, Modifying, and Implementing Fourier Transform Algorithms on Various Architectures" by J. R. Johnson, R. W. Johnson (two of the inventors herein), D. Rodriquez and R. Tolimieri (Circuits Systems Signal Process., 9(4) :449–500, 1990) herein fully incorporated by reference. Our former cited paper presents a detailed study of "stride permutations" associated with tensor products, and their relation to the addressing requirements in C-T type algorithms.

The reader is also referred to a subsequent paper entitled "Multilinear Algebra and Parallel Programming" by the inventors R. W. Johnson, J. R. Johnson and by C.-H. Huang (*The Journal of Supercomputing*, 5:189–217, 1991), also herein incorporated by reference, for a discussion of how tensor product operations can be implemented on vector and parallel computers, such as the Cray Y-MP vector architecture machine, and the Encore Multimax parallel architecture machine, for non-C-T FFT algorithms. The reader is further referred to the inventors' recent paper entitled "Multidimensional Cooley-Tukey Algorithms Revisited" (by L. Auslander, J. R. Johnson, and R. W. Johnson, *Advances in Applied Mathematics*, December 1996), also herein incorporated by reference, which re-examines the C-T FFT algorithm with a view of writing it in a multidimensional manner. This paper, which was scheduled to be published in December, 1996, is also attached hereto as "Appendix A." In this paper the representation theory of Abelian groups is used to obtain an algebraic divide and conquer algorithm for computing the finite Fourier transform. The algorithm computes the Fourier transform of a finite Abelian group in terms of the Fourier transforms of an arbitrary subgroup and its quotient. From this algebraic algorithm, a procedure is derived for obtaining concrete factorizations of the Fourier transform matrix in terms of smaller Fourier transform matrices, diagonal multiplications and permutations. For cyclic groups, the C-T algorithm is a special case. For groups with several generators, the procedure gives a variety of multidimensional C-T type algorithms. The method of designing multidimensional FFT algorithms gives different flow patterns from the standard "row-column" approaches.

Given the disclosures of the above-cited three papers of the inventors as background information, the inventors have discovered that for any given "size" and dimension of FFT, an equation can be written using tensor-product principles, that looks very similar to FFT equations in other dimensions. For example, the one dimension C-T type FFT of size 16 is written as:

$$y = F_{16} x. \quad \text{Eqn 1}$$

The two dimension C-T type FFT of size 16 is written as:

$$y = F_{(4,4)} x. \quad \text{Eqn 2}$$

Both the one and two dimension C-T FFTs of Equations 1 and 2 can be written as:

$$y = (F_2 \oplus I_8) L_2^{16} T_3 \, (F_2 \oplus I_8) L_2^{16} T_2 \, (F_2 \oplus I_8) L_2^{16} T_1 \, (F_2 \oplus I_8) L_2^{16} P \quad \text{Eqn 3}$$

For different choices of diagonal matrices "$T_1$, $T_2$ and $T_3$" and a permutation "P". The factor $(F_2 \oplus I_8)$ read as "$F_2$ tensor $I_8$" represents an 8-fold computation of $F_2$. The designation $L_2^{16}$ is also a permutation, referred to as a load-stride permutation on a vector of length 16 at stride 2. It recognizes a vector by collecting the elements at stride 2 into two segments of length 8 as illustrated below.

(0  1  2  3  4  5  6  7  8  9  10  11  12  13  14  15)

↓

(0  2  4  6  8  10  12  14  1  3  5  7  9  11  13  15).

The three dimension C-T type FFT of size 64

$$y = F_{(4,4,4)} x \quad \text{Eqn 4}$$

can be written in a similar way, requiring six factors $$F_{(4,4,4)} = (F_2 \otimes I_{32}) L_2^{64} T_1 P \quad \text{Eqn 5}$$

$$(F_2 \otimes I_{32}) L_2^{64} T_2$$

$$(F_2 \otimes I_{32}) L_2^{64} T_3$$

$$(F_2 \otimes I_{32}) L_2^{64} T_4$$

$$(F_2 \otimes I_{32}) L_2^{64} T_5$$

$$(F_2 \otimes I_{32}) L_2^{64} T_6.$$

In Equation 5, the $T_i$'s are diagonals and P is a permutation. However, the $F_{(4,4,4)}$ can also be expanded in terms of three computations of size 4 as shown in Equation 6.

$$F_{(4,4,4)} = (F_4 \oplus I_{16}) L_4^{64} \, (F_4 \oplus I_{16}) L_4^{64} \, (F_4 \oplus I_{16}) L_4^{64}. \quad \text{Eqn 6}$$

The one dimension C-T type FFT of size 64

$$y = F_{64} x \quad \text{Eqn 7}$$

can be written in exactly the same way as the format of Equation 6, with "twiddle" factors ($T_1'$), and a permutation (P') as shown below in Equation 8.

$$F_{(64)} = (F_4 \oplus I_{16}) L_4^{64} T_3' \, (F_4 \oplus I_{16}) L_4^{64} T_2' \, (F_4 \oplus I^{16}) L_4^{64} T_1' P' \quad \text{Eqn 8}$$

The twiddle factors are multiplications by complex numbers. It will be appreciated that such twiddle factor multiplication can be by "the identity" (i.e., by the complex number 1).

The corresponding two dimension C-T type FFT of size 64

$$y = F_{(8,8)} x \quad \text{Eqn 9}$$

can be written in a similar way in terms of basic computations of size 4 as shown in Equation 10.

$$F_{(8,8)} = (F_4 \oplus I_{16}) L_4^{64} T_3'' \, (F_{(2,2)} \oplus I_{16}) L_4^{64} T_2'' \, (F_4 \oplus I_{16}) L_4^{64} T_3'' P'' \quad \text{Eqn 10}$$

For twiddle factors $T_i''$ and permutation P''.

Comparison of the formulations of Equations 6, 8 and 10 show that all three equations for the one-, two- and three-dimension FFTs for a given size FFT are basically the same except for the twiddle factors and permutations. The significance of this finding is that if you equate the $(F_4 \oplus I_{16})$ portions of the equations with basic computational hardware building blocks where the size of such building blocks corresponds to the radix, such basic computations can be implemented in hardware in such a way that the total factors and permutations can be reconfigured such that the same-reconfigurable machine can be used to evaluate all of the one dimension, two dimension and three dimension C-T type FFTs. All that differs in the equations are the complex multipliers. We have therefore created a "dimensionless" C-T FFT algorithm representation that has immense commercial implications in the creation of hardware and software for implementation thereof which has the potential for reducing the calculation speed of the algorithm by one or more orders of magnitude. The following Examples illustrate a number of hardware apparatus devices illustrated in reconfigurable hardware form, for computing the dimensionless fast Fourier transforms configured according to the above-described tensor product formulation for the C-T FFT algorithm. It will be understood that while specific examples are illustrated, the principles illustrated in these examples are applicable to the implementation of complex Fourier transforms of any dimension and any number of points. Those skilled in the art will readily understand how the principles of this invention can be expanded to any application with which they may be faced.

EXAMPLE 1

Figure 1:
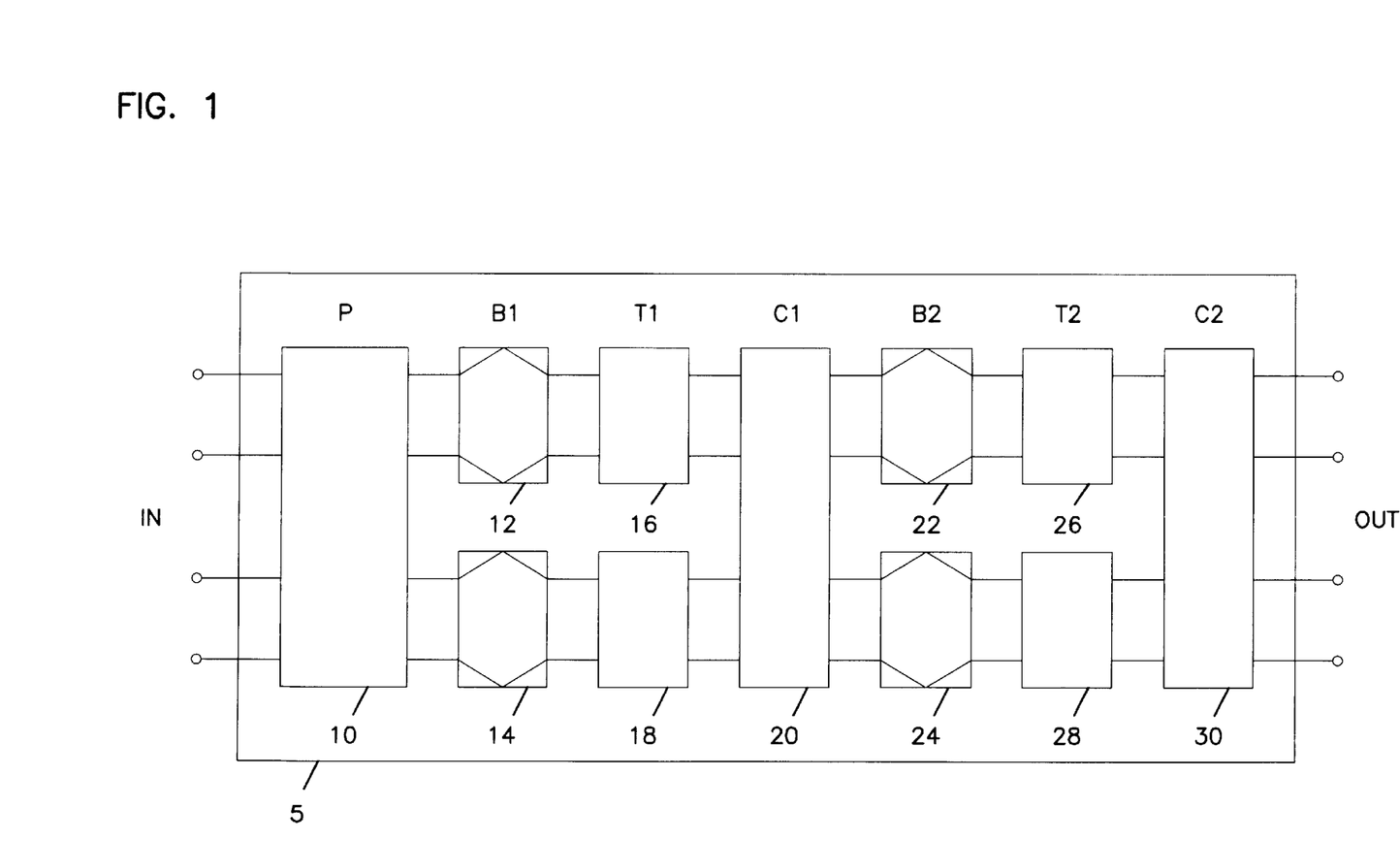
FIG. 1 is a functional multipurpose block diagram of an apparatus that can compute either a one-dimensional 4-point complex Fourier transform or a two-dimensional 2×2-point Fourier transform.

Referring to FIG. 1, a block diagram is illustrated of a device 5 that can compute either the one-dimensional 4-point complex Fourier transform (FT) or the two-dimensional 2×2-point FT. The diagram is meant to be read from left to right. In other words, the input is presented to the permutation block 10 (also indicated at "P"), then to the pair of basic computation blocks 12 and 14 (also indicated at "B1"), then to the pair of twiddle factor blocks 16 and 18 (also indicated at "T1"), then to the permutation block 20 (also indicated at "C1") which represents an interconnection between stages, then to basic computation blocks 22 and 24, to twiddle factor blocks 26 and 28 and finally to permutation block 30. Signal outputs are derived from the output ports of functional block 30. The cycle BTC of FIG. 1 is called a "stage" of the computation and elements of computation stages one and two of the diagram have been followed by the "1" and "2" numerical designations respectively. Accordingly, the diagram of FIG. 1 is a two-stage computation. While separate stages of the computation are illustrated in the FIG. 1 diagram, in actually hardware, only one stage need be implemented and used serially, with the electronic reconfiguration of the respective functional blocks of the diagram, as will be readily understood by those skilled in the art.

The permutation block 10 (P) represents a permutation of the input data. This functional block is intended to be reconfigurable. The "B" blocks 12, 14, 22 and 24 represent smaller basic computations of dimensionless FTs of the base size. Each of these blocks is also intended to be reconfigurable. The "T" blocks 16, 18, 26 and 28 represent twiddle factors or multiplication by complex numbers. These blocks are also intended to be reconfigurable. The "C" blocks 20 and 30 represent the interconnection between the stages and can be designed to be fixed or reconfigurable. In this specific preferred embodiment example and those to follow, the "C" blocks are fixed and are examples of load-stride permutations.

EXAMPLE 2

Figure 2:
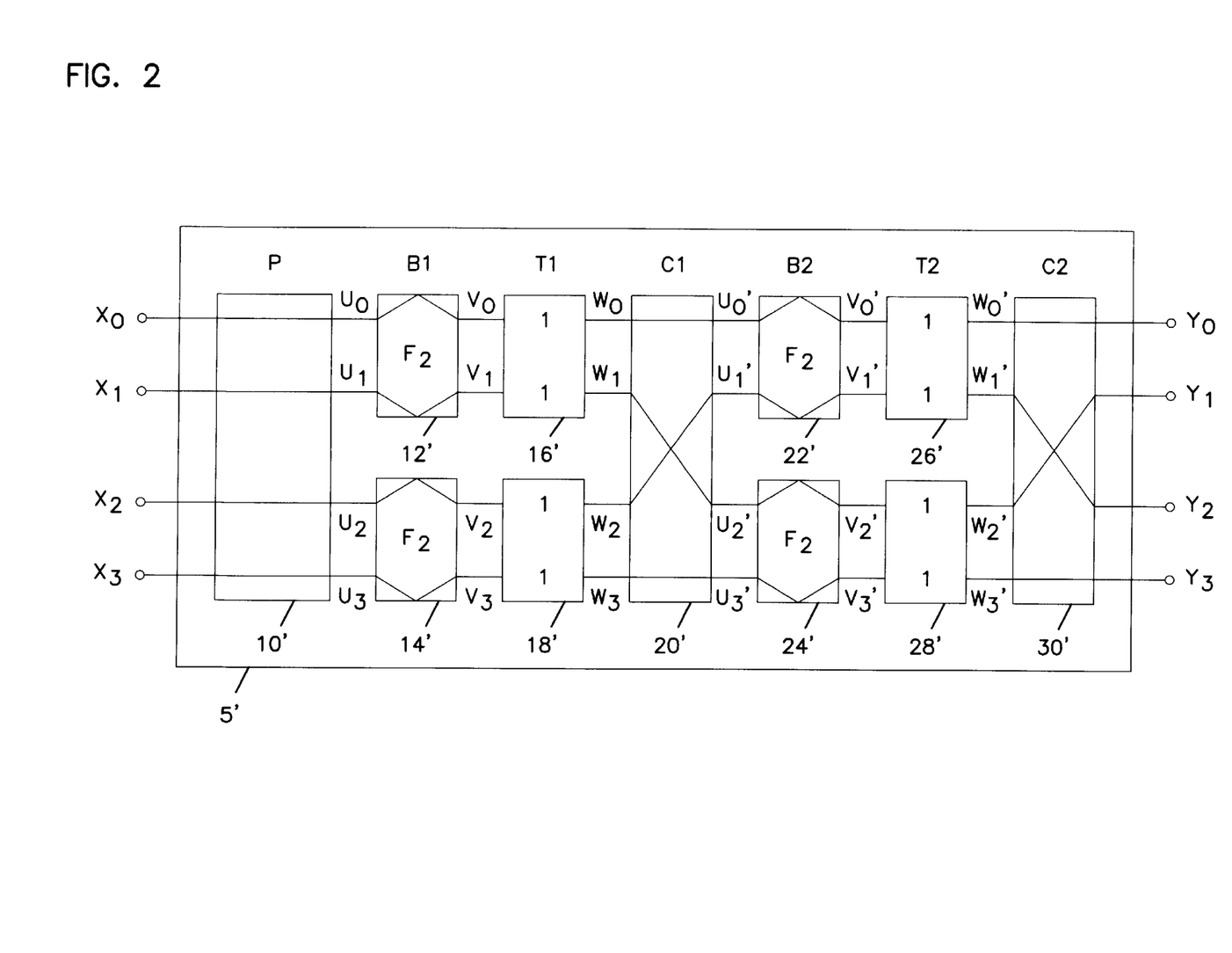
FIG. 2 is a functional block diagram of the apparatus of FIG. 1 illustrated as it would be configured to compute a 4-point 2×2 two-dimensional fast Fourier transform using the basic computation of size 2.

In FIG. 2, the hardware of FIG. 1 is illustrated as configured to compute the 4-point 2×2 two-dimensional FFT using the basic computation of size 2, of which there is only one configuration, the one-dimensional FT, and $F_2$. In this example: The "P" permutation functional block 10' passes the signal straight through (i.e., is an identity permutation); the basic computational blocks "B" 12', 14', 22' and 24' equal $F_2$; the "T" twiddle factor blocks 16', 18', 26' and 28' represent unity (i.e., multiplication by the complex number 1); and the interconnection "C" blocks 20' and 30' are the load-stride permutation $L_2^4$ load, a 4-vector at stride 2 as shown below:

$$\begin{array}{c} x_0 \\ x_1 \\ x_2 \\ x_3 \end{array} \rightarrow \begin{array}{c} x_0 \\ x_2 \\ x_1 \\ x_3 \end{array}.$$

The hardware configuration of FIG. 2 calculates the two-dimensional equation shown in Equation 11 below.

$$y = (F_2 \oplus F_2)x = L_2^4(I_2 \oplus F_{24})L_2^4(I_{L2} \oplus F_2)x \qquad \text{Eqn 11}$$

The signal input and output values indicated at the respective signal flow paths in FIG. 2 are illustrated in tabular form in Table 1.

TABLE 1

| SIGNAL OUTPUT VALUES FOR FIG. 2 CONFIGURATION | | |
|---|---|---|
| FIRST STAGE | | |
| $u_0 = x_0$ | $v_0 = u_0 + u_1$ | $w_0 = 1 \cdot v_0$ |
| $u_1 = x_1$ | $v_1 = u_0 - u_1$ | $w_1 = 1 \cdot v_1$ |
| $u_2 = x_2$ | $v_2 = u_2 + u_3$ | $w_2 = 1 \cdot v_2$ |
| $u_3 = x_3$ | $v_3 = u_2 - u_3$ | $w_3 = 1 \cdot v_3$ |
| SECOND STAGE | | |
| $u_0' = w_0$ | $v_0' = u_0' + u_1'$ | $w_0' = 1 \cdot v_0'$ |
| $u_1' = w_2$ | $v_1' = u_0' - u_1'$ | $w_1' = 1 \cdot v_1'$ |
| $u_2' = w_1$ | $v_2' = u_2' + u_3'$ | $w_2' = 1 \cdot v_2'$ |
| $u_3' = w_3$ | $v_3' = u_2' - u_3'$ | $w_3' = 1 \cdot v_3'$ |

The signal output values for $y_0$, $y_1$, $y_2$ and $y_3$ are shown respectively in Equations 12, 13, 14 and 15.

$$y_0 = w_0' = v_0' = u_0' + u_1' = w_0 + w_2 = v_0 + v_2 = u_0 + u_1 + u_2 + u_3 = x_0 + x_2 + x_1 + x_3 = x_0 + x_1 + x_2 + x_3 \qquad \text{Eqn 12}$$

$$y_1 = w_2' = v_2' = u_2' + u_3' = w_1 + w_3 = v_1 + v_3 = u_0 - u_1 + u_2 - u_3 = x_0 - x_1 + x_2 - x_3 = x_0 - x_1 + x_2 - x_3 \qquad \text{Eqn 13}$$

$$y_2 = w_1' = v_1' = u_0' - u_1' = w_0 - w_2 = v_0 - v_2 = u_0 + u_1 - u_2 - u_3 = x_0 + x_1 - x_2 - x_3 \qquad \text{Eqn 14}$$

$$y_3 = w_3' = v_3' = u_2' - u_3' = w_1 - w_3 = v_1 - v_3 = u_0 - u_1 - u_2 + u_3 = x_0 - x_1 - x_2 + x_3 \qquad \text{Eqn 15}$$

As stated above, while each computation stage is illustrated in FIG. 2, the actual hardware could be built using simply one stage of reconfigurable components which are reconfigured after computations of one stage are concluded and are serially reused after such reconfiguration.

EXAMPLE 3

Figure 3:
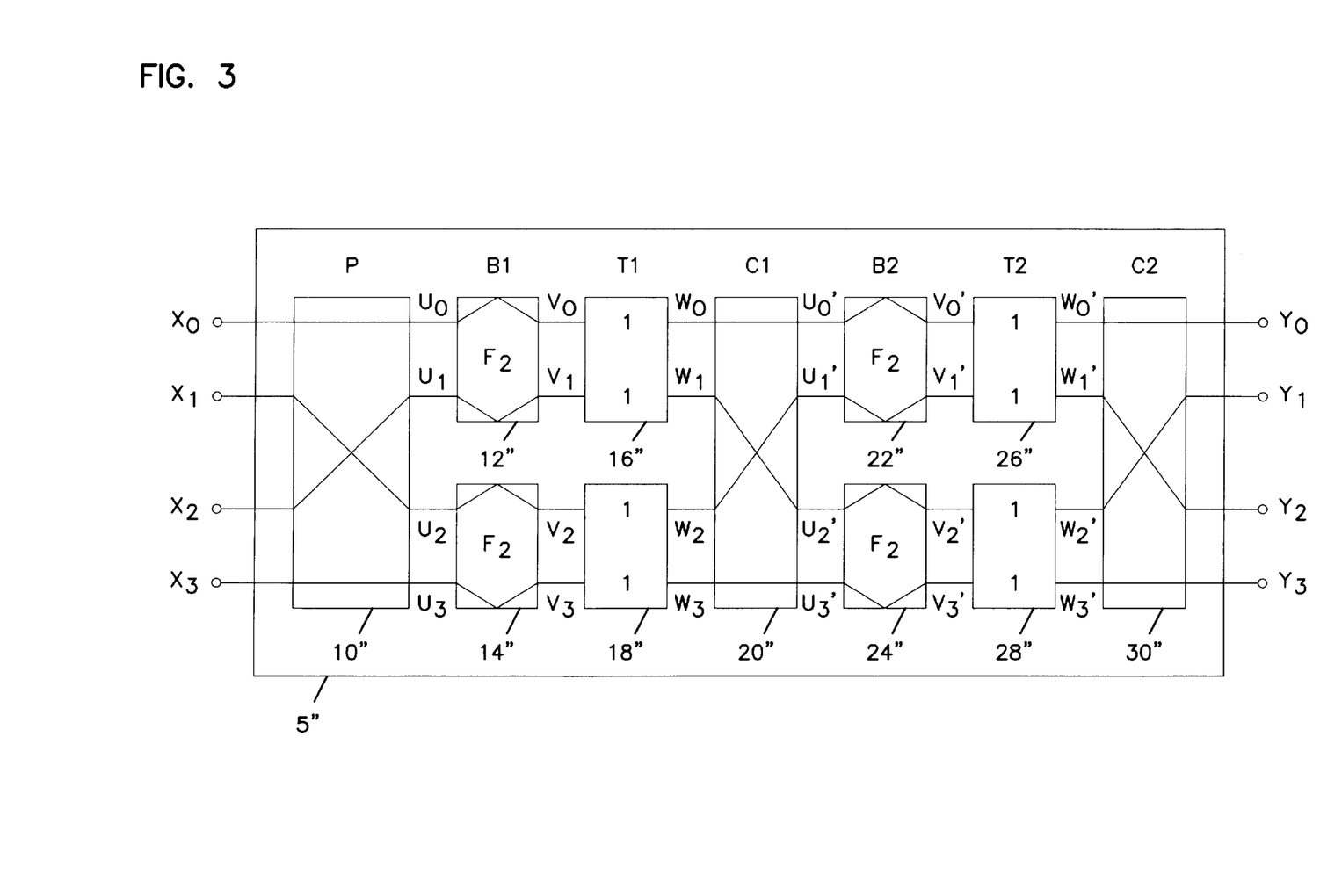
FIG. 3 is a functional block diagram of the apparatus of FIG. 1 illustrated as it would be configured to compute a 4-point one-dimensional fast Fourier transform.

FIG. 3 illustrates the same basic hardware diagram as used in FIG. 1 with the functional components configured to compute the 4-point one-dimensional FFT of Equation 16.

$$y=F_4 x=L_2{}^4(I_2 \oplus F_2)L_2{}^4 T_2{}^4(I_2 \oplus F_2)L_2{}^4 x \quad \text{Eqn 16}$$

The signal input and output values indicated at the respective signal flow paths in FIG. 3 are illustrated in tabular form in Table 2.

TABLE 2

SIGNAL OUTPUT VALUES FOR FIG. 3 CONFIGURATION

FIRST STAGE

| | | |
|---|---|---|
| $u_0 = x_0$ | $v_0 = u_0 + u_1$ | $w_0 = 1 \cdot v_0$ |
| $u_1 = x_1$ | $v_1 = u_0 - u_1$ | $w_1 = 1 \cdot v_1$ |
| $u_2 = x_2$ | $v_2 = u_2 + u_3$ | $w_2 = 1 \cdot v_2$ |
| $u_3 = x_3$ | $v_3 = u_2 - u_3$ | $w_3 = 1 \cdot v_3$ |

SECOND STAGE

| | | |
|---|---|---|
| $u_0' = w_0$ | $v_0' = u_0' + u_1'$ | $w_0' = 1 \cdot v_0'$ |
| $u_1' = w_2$ | $v_1' = u_0' - u_1'$ | $w_1' = 1 \cdot v_1'$ |
| $u_2' = w_1$ | $v_2' = u_2' + u_3'$ | $w_2' = 1 \cdot v_2'$ |
| $u_3' = w_3$ | $v_3' = u_2' - u_3'$ | $w_3' = 1 \cdot v_3'$ |

For this configuration: The permutation "P" functional block 10'' is configured for $L_2{}^4$; the "B" basic computation functional blocks 12'', 14'', and 22'' and 24'' equal $F_2$; the "T1" twiddle factor functional blocks 16'' and 18'' in the first stage comprise multiplication by the complex numbers 1, 1, 1, i and the "T2" twiddle factor functional blocks 26'' and 28'' in the second stage comprise the identity (i.e., multiplication by the complex number 1); and the interconnection "C" functional blocks 20'' and 30'' are configured for the fixed load-stride permutation $L_2{}^4$ as was the case for the Example 2 configuration.

The output values for $y_0$, $y_1$, $y_2$ and $y_3$ for this example are given in Equations 17 through 20 respectively.

$$y_0 = w_0' = v_0' = u_2' + u_1' = w_0 + w_2 = v_0 + v_2 = u_0 + u_1 + u_2 + u_3 = x_0 + x_2 + x_1 + x_3 = x_0 + x_1 + x_2 + x_3 \quad \text{Eqn 17}$$

$$y_1 = w_2' = v_2' = u_2' + u_3' = w_1 + iw_3 = v_1 + iv_3 = u_0 - u_1 + iu_2 - iu_3 = x_0 - x_2 + ix_1 - ix_3 = x_0 + ix_1 - x_2 - ix_3 \quad \text{Eqn 18}$$

$$y_2 = w_1' = v_1' = u_0' - u_1' = w_0 - w_2 = v_0 - v_2 = u_0 + u_1 - u_2 - u_3 = x_0 + x_2 - x_1 - x_3 = x_0 - x_1 + x_2 - x_3 \quad \text{Eqn 19}$$

$$y_3 = w_3' = v_3' = u_2' - u_3' = w_1 - iw_3 = v_1 - iv_3 = u_0 - u_1 - iu_2 + iu_3 = x_0 - x_2 - ix_1 + ix_3 = x_0 - ix_1 - x_2 + ix_3 \quad \text{Eqn 20}$$

EXAMPLE 4

Figure 4A:
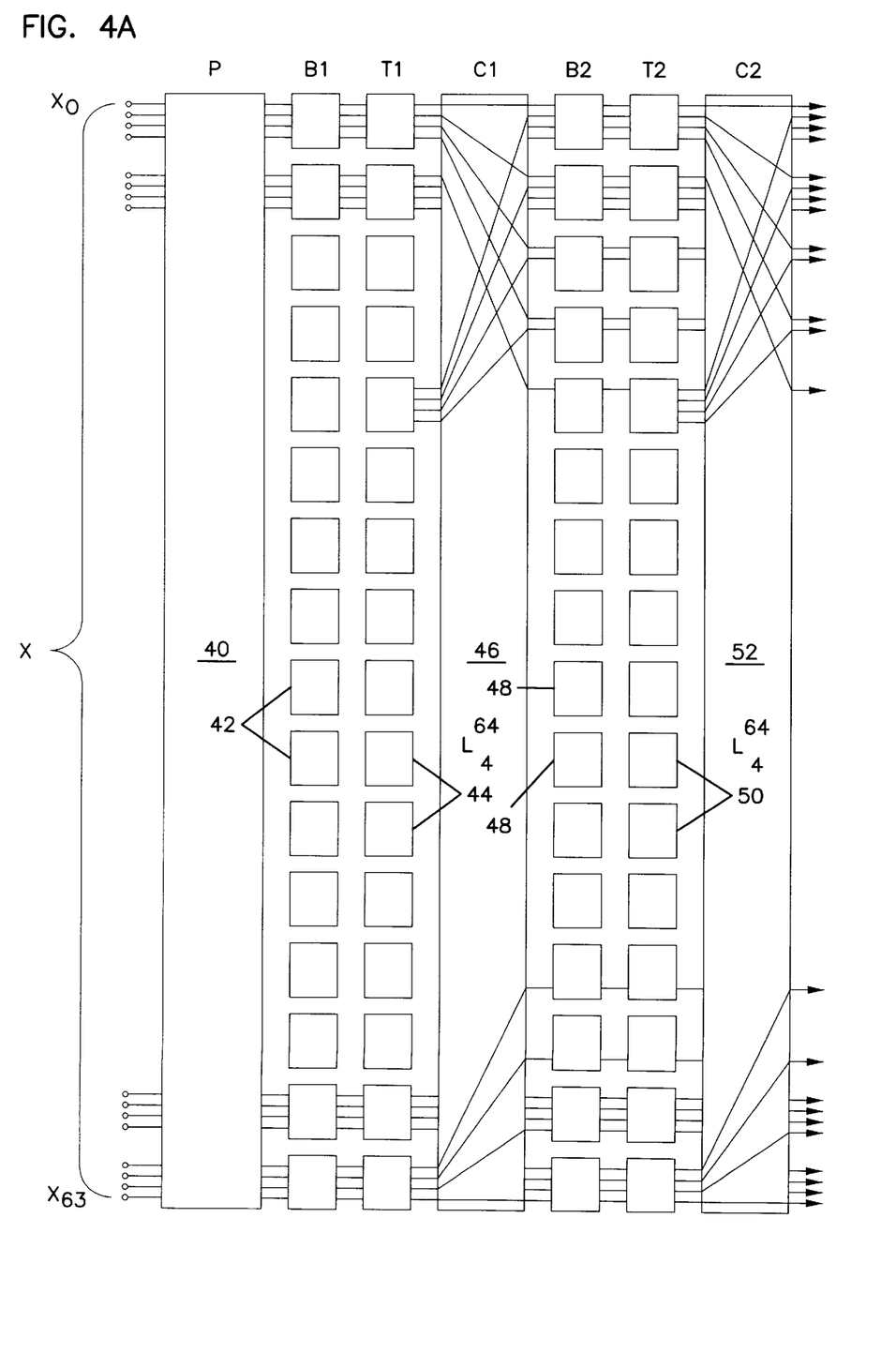
Figure 4B:
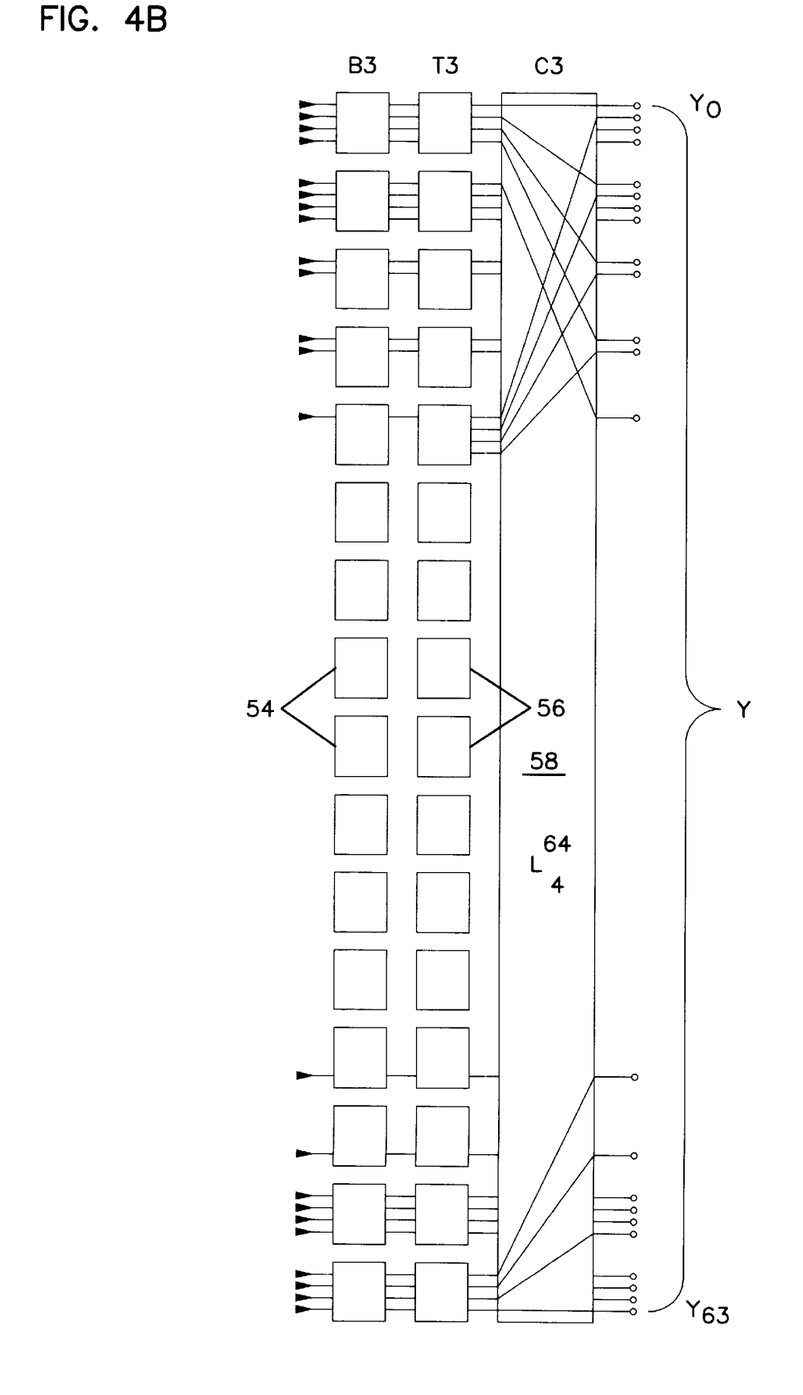

FIG. 4 illustrates a block diagram of a computing configuration for a size 64 FFT, which depends on basic computations of size 4. This same basic hardware configuration can be used to compute any of the three following scenarios:
(1) a one-dimensional 64-point FFT;
(2) a two-dimensional 8×8 FFT; or
(3) a three-dimensional 4×4×4 FFT,
with a fixed interconnection permutation $C = L_4{}^{64}$ load-stride of a 64-vector at stride 4. Referring to FIG. 4, it will be noted that there is one "P" permutation functional block 40 to which the signal input terminals are applied. The output signals from the permutation functional block 40 are applied through sixteen "B" functional blocks generally indicated at 42 to the signal input terminals of sixteen corresponding "T" twiddle factor functional blocks generally indicated at 44 to the input terminals of the "C" interconnection permutation block 46. It will be noted that not all of the wiring interconnections for the "C" functional block 46 have been illustrated in FIG. 4. However, those skilled in the art will be able to provide the appropriate interconnections for the "C" functional block 46 that correspond to a load-stride of a 64-vector at stride 4. The $L_4{}^{64}$ permutation is shown below:

| | | |
|---|---|---|
| $x_0$ | | $x_0$ |
| $x_1$ | | $x_4$ |
| $x_2$ | | $x_8$ |
| $x_3$ | | $x_{12}$ |
| $x_4$ | | $x_{16}$ |
| $x_5$ | | $x_{20}$ |
| $x_6$ | | $x_{24}$ |
| $x_7$ | | $x_{28}$ |
| $x_8$ | | $x_{32}$ |
| $x_9$ | | $x_{36}$ |
| $x_{10}$ | | $x_{40}$ |
| $x_{11}$ | | $x_{44}$ |
| $x_{12}$ | | $x_{48}$ |
| $x_{13}$ | | $x_{52}$ |
| $x_{14}$ | | $x_{56}$ |
| $x_{15}$ | | $x_{60}$ |
| $x_{16}$ | | $x_1$ |
| $x_{17}$ | | $x_5$ |
| $x_{18}$ | | $x_9$ |
| $x_{19}$ | | $x_{13}$ |
| $x_{20}$ | | $x_{17}$ |
| $x_{21}$ | | $x_{21}$ |
| $x_{22}$ | | $x_{25}$ |
| $x_{23}$ | | $x_{29}$ |
| $x_{24}$ | | $x_{33}$ |
| $x_{25}$ | | $x_{37}$ |
| $x_{26}$ | | $x_{41}$ |
| $x_{27}$ | | $x_{45}$ |
| $x_{28}$ | | $x_{49}$ |
| $x_{29}$ | | $x_{53}$ |
| $x_{30}$ | | $x_{57}$ |
| $x_{31}$ | $\rightarrow$ | $x_{61}$ |
| $x_{32}$ | | $x_2$ |
| $x_{33}$ | | $x_6$ |
| $x_{34}$ | | $x_{10}$ |
| $x_{35}$ | | $x_{14}$ |
| $x_{36}$ | | $x_{18}$ |
| $x_{37}$ | | $x_{22}$ |
| $x_{38}$ | | $x_{26}$ |
| $x_{39}$ | | $x_{30}$ |
| $x_{40}$ | | $x_{34}$ |
| $x_{41}$ | | $x_{38}$ |
| $x_{42}$ | | $x_{42}$ |
| $x_{43}$ | | $x_{46}$ |
| $x_{44}$ | | $x_{50}$ |
| $x_{45}$ | | $x_{54}$ |
| $x_{46}$ | | $x_{58}$ |
| $x_{47}$ | | $x_{62}$ |
| $x_{48}$ | | $x_3$ |
| $x_{49}$ | | $x_7$ |
| $x_{50}$ | | $x_{11}$ |
| $x_{51}$ | | $x_{15}$ |
| $x_{52}$ | | $x_{19}$ |
| $x_{53}$ | | $x_{23}$ |
| $x_{54}$ | | $x_{27}$ |
| $x_{55}$ | | $x_{31}$ |
| $x_{56}$ | | $x_{35}$ |
| $x_{57}$ | | $x_{39}$ |
| $x_{58}$ | | $x_{43}$ |
| $x_{59}$ | | $x_{47}$ |
| $x_{60}$ | | $x_{51}$ |
| $x_{61}$ | | $x_{55}$ |
| $x_{62}$ | | $x_{59}$ |
| $x_{63}$ | | $x_{63}$ |

The components of the second and third BTC stages are similar to those of the first stage. The sixteen "B" functional blocks of the second stage are generally indicated at 48. The sixteen "T" functional blocks of the second stage are generally indicated at 50, and the "C" interconnection block of the second stage is indicated at 52. Similarly, the sixteen "B"

functional blocks of the third stage are generally indicated at 54. The sixteen "T" functional blocks of the third stage are generally indicated at 56, and the "C" interconnection functional block of the third stage is indicated at 58. The signal outputs of the computation hardware are provided from the "C" functional block 58 of the third stage.

EXAMPLE 5

Figure 5A:
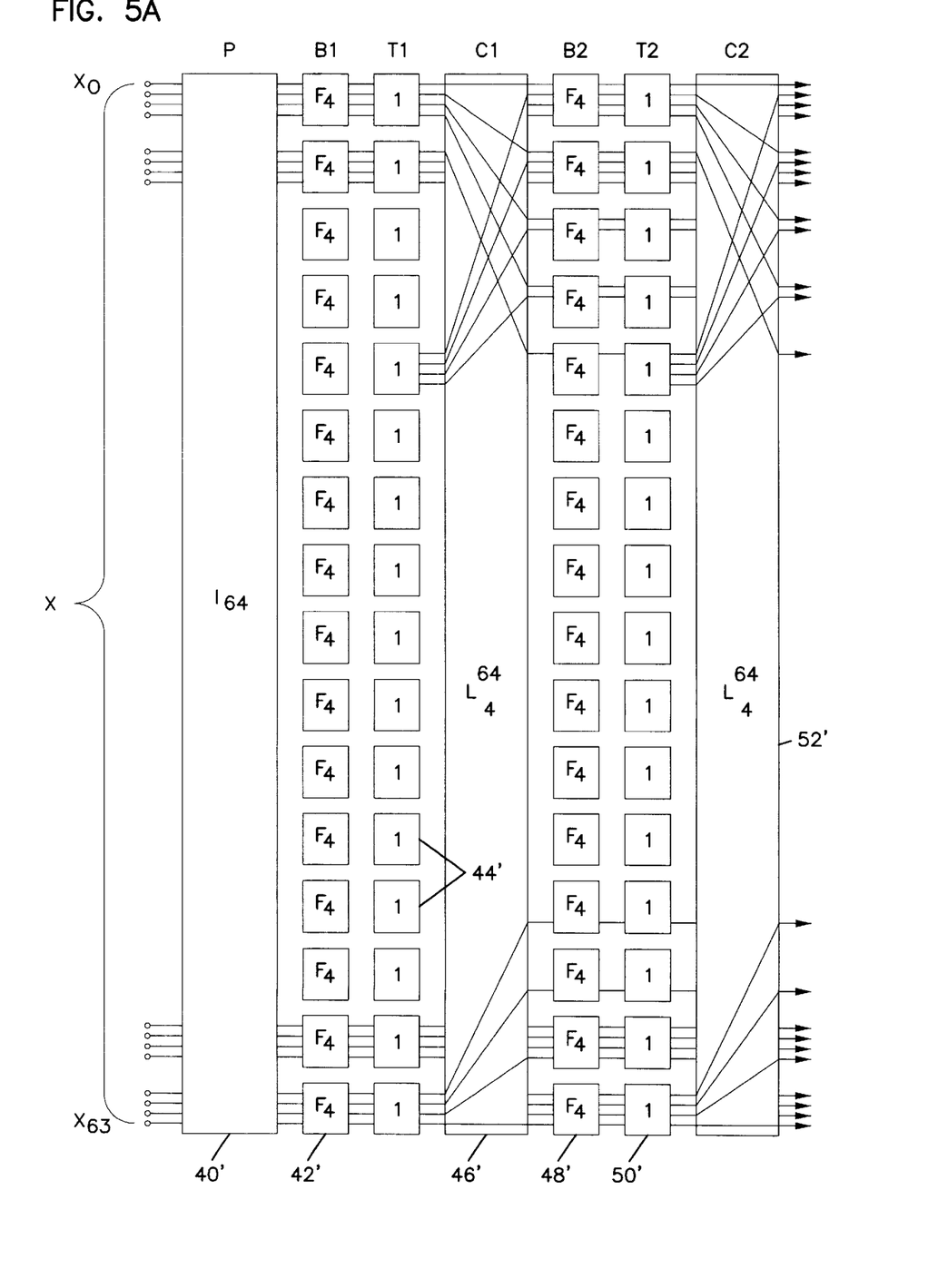
FIGS. 5A and 5B, illustrates the functional block diagram apparatus of FIG. 4 for computing a three-dimensional 4×4×4-point fast Fourier transform.
Figure 5B:
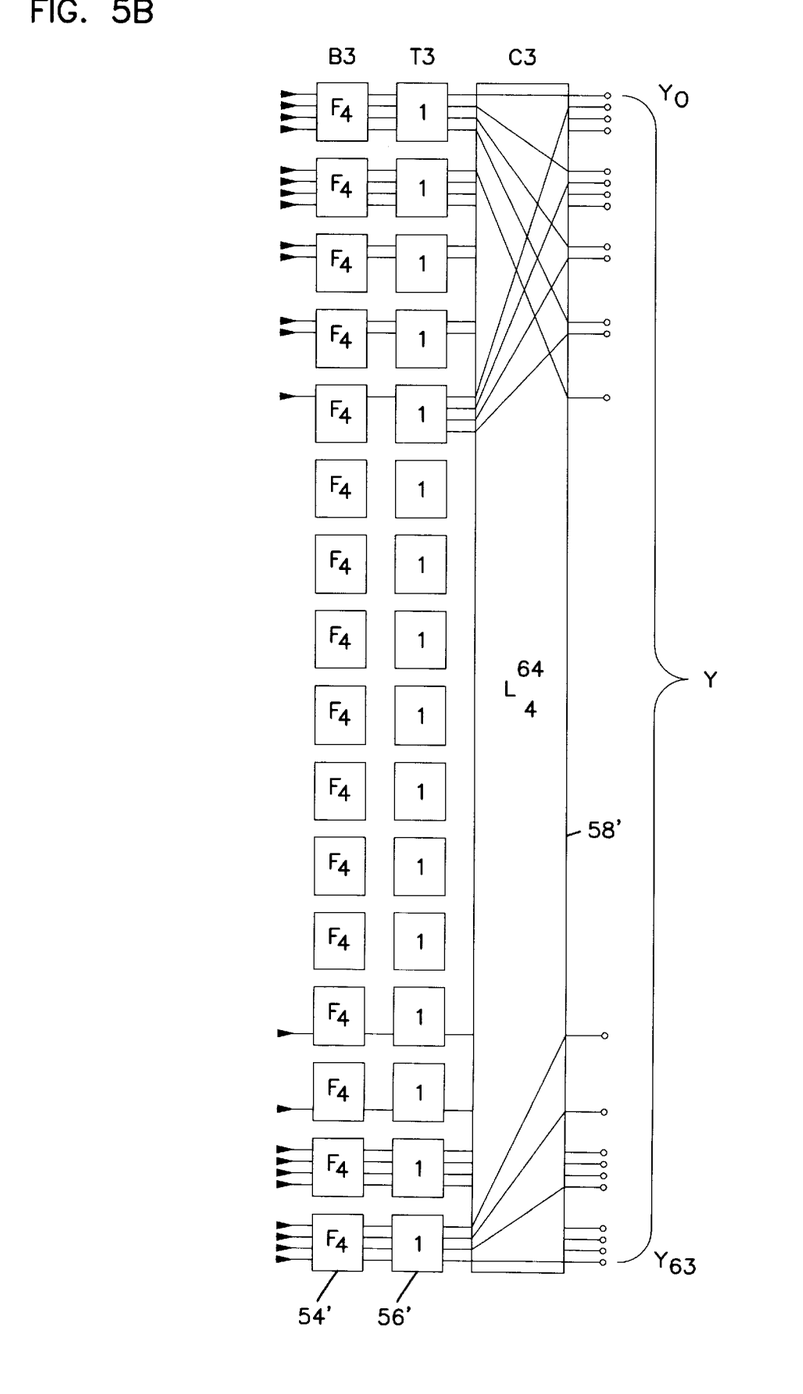

This example illustrates the functional circuitry of FIG. 4 as it would be configured for computing the three-dimensional 4×4×4-point FFT of Equation 6. In this configuration: The "P" permutation functional block 40' is configured for the identity multiplication by the complex number 1; the "B" basic computation functional blocks 42', 48' and 54' are all configured for the base size FT ($F_4$); and the "T" twiddle factor functional blocks 44', 50' and 56' are configured for the identity in all stages.

EXAMPLE 6

Figure 6A:
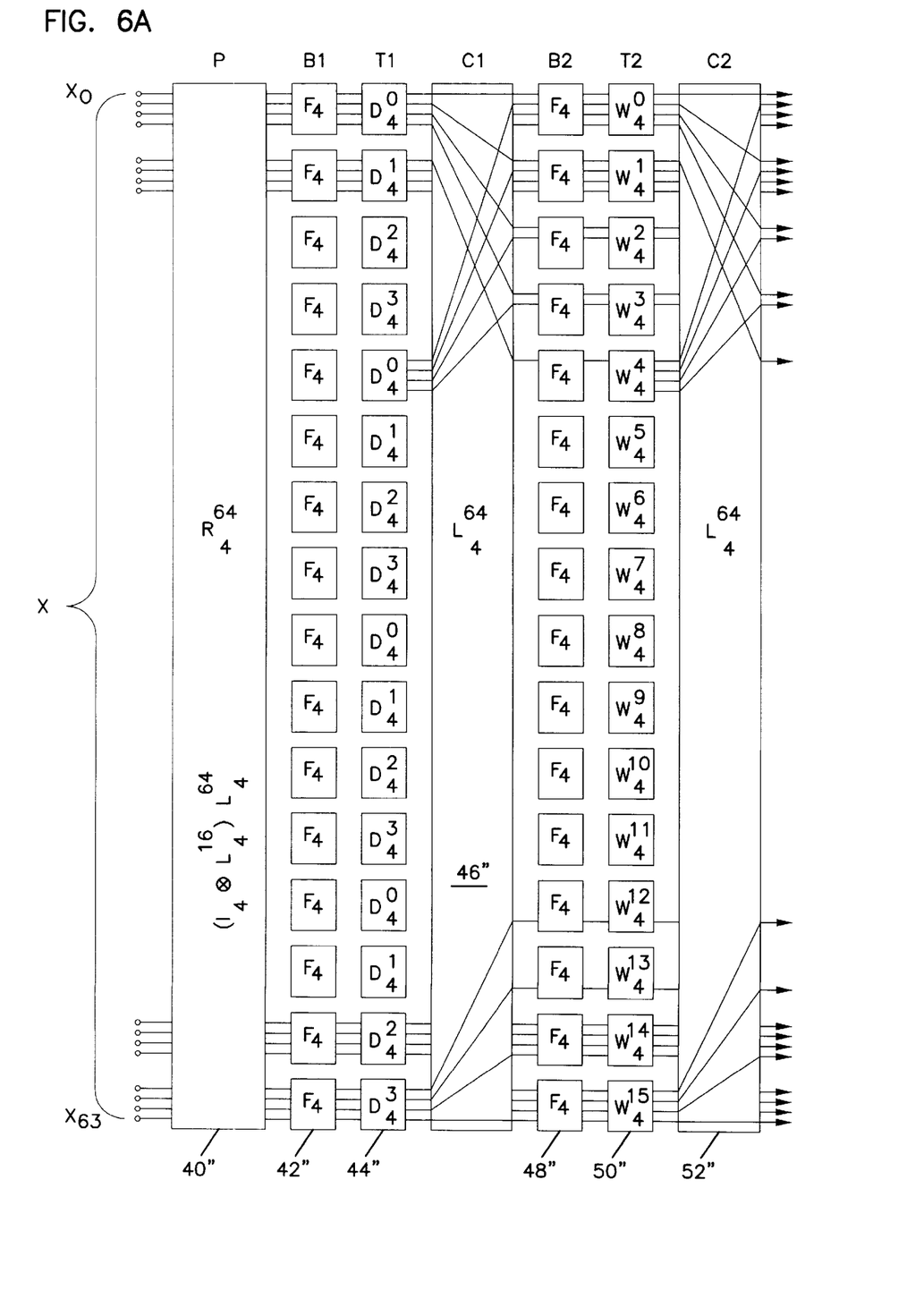
FIGS. 6A and 6B, illustrates the functional block diagram apparatus of FIG. 4 configured to compute a one-dimensional 64-point fast Fourier transform.
Figure 6B:
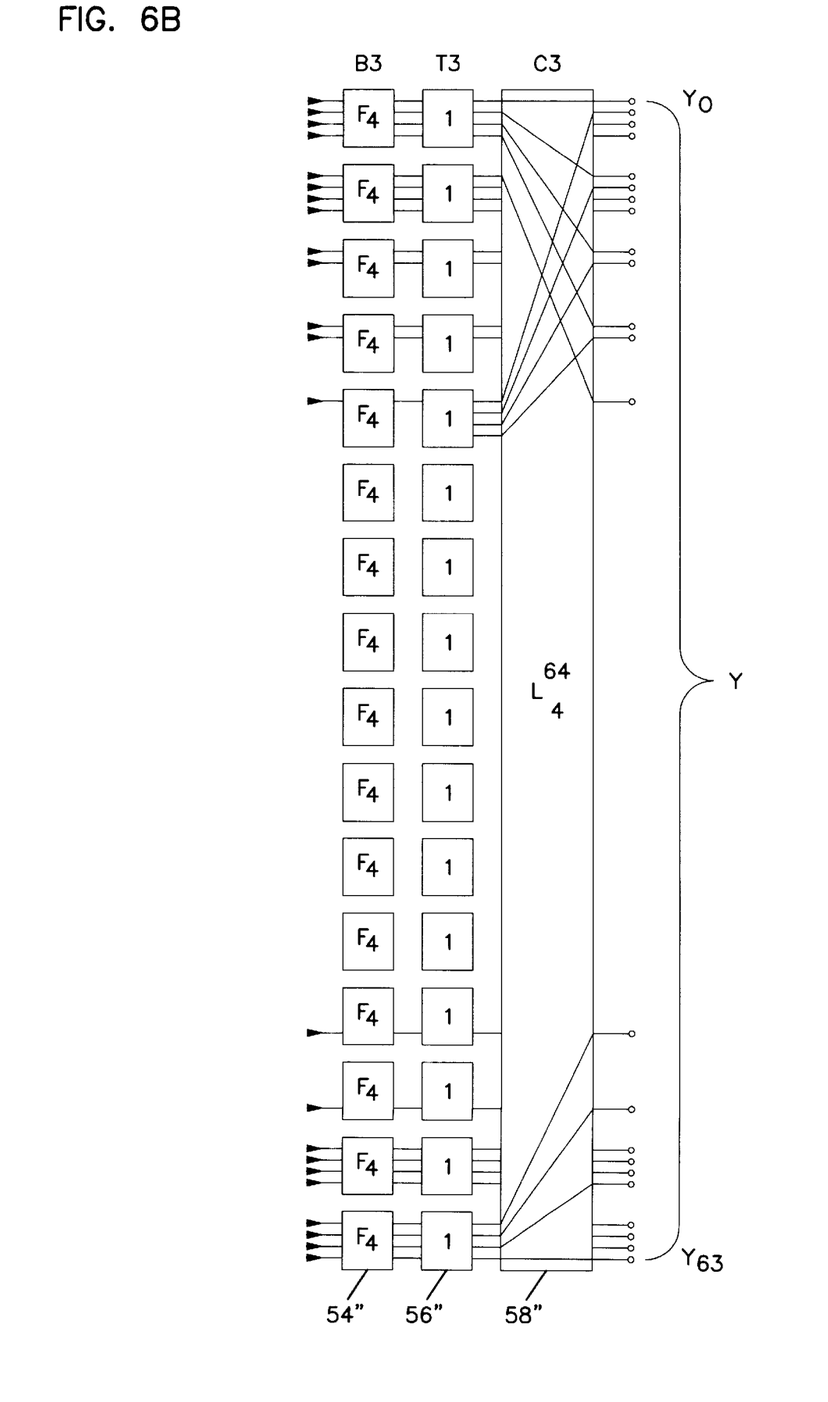

In FIG. 6 the basic hardware configuration of FIG. 4 is illustrated as it would be configured for computing the one-dimensional 64-point FFT of Equation 8. In the FIG. 6 configuration: The "P" permutation functional block 40" is configured as the radix-4 bit reversal permutation ($R_{64}^4 = (I_4 \oplus L_4^{16})L_4^{64}$. The "B" functional blocks 42", 48" and 54" are the same as in Example 5 and equal $F_4$ in all stages. The "T" twiddle factor functional blocks 44" in the first BTC stage contain several non-trivial complex multiplications as positionally indicated in the 44" functional blocks of FIG. 6, according to the following key:

(a) $D_4^0 = 1,1,1,1$
(b) $D_4^1 = 1,i,-1,-i$
(c) $D_4^2 = 1,-1,1,-1$
(d) $D_4^3 = 1,-i,-1,i$.

The "T" functional blocks 50" in the second BTC stage contain non-trivial complex multiplications as indicated in the respective functional blocks 50" in FIG. 6 according to the following key, where w is a primitive 64th root of unity:

(a) $W_4^0 = 1,1,1,1$
(b) $W_4^1 = 1,w,w^2,w^3$
(c) $W_4^2 = 1,w^2,w^4,w^6$
(d) $W_4^3 = 1,w^3,w^6,w^9$
(e) $W_4^4 = 1,w^4,w^8,w^{12}$
(f) $W_4^5 = 1,w^5,w^{10},w^{15}$
(g) $W_4^6 = 1,w^6,w^{12},w^{18}$
(h) $W_4^7 = 1,w^7,w^{14},w^{21}$
(i) $W_4^8 = 1,w^8,w^{16},w^{24}$
(j) $W_4^9 = 1,w^9,w^{18},w^{27}$
(k) $W_4^{10} = 1,w^{10},w^{20},w^{30}$
(l) $W_4^{11} = 1,w^{11},w^{21},w^{33}$
(m) $W_4^{12} = 1,w^{12},w^{24},w^{36}$
(n) $W_4^{13} = 1,w^{13},w^{26},w^{39}$
(o) $W_4^{14} = 1,w^{14},w^{28},w^{42}$
(p) $W_4^{15} = 1,w^{15},w^{30},w^{45}$.

EXAMPLE 7

Figure 7A:
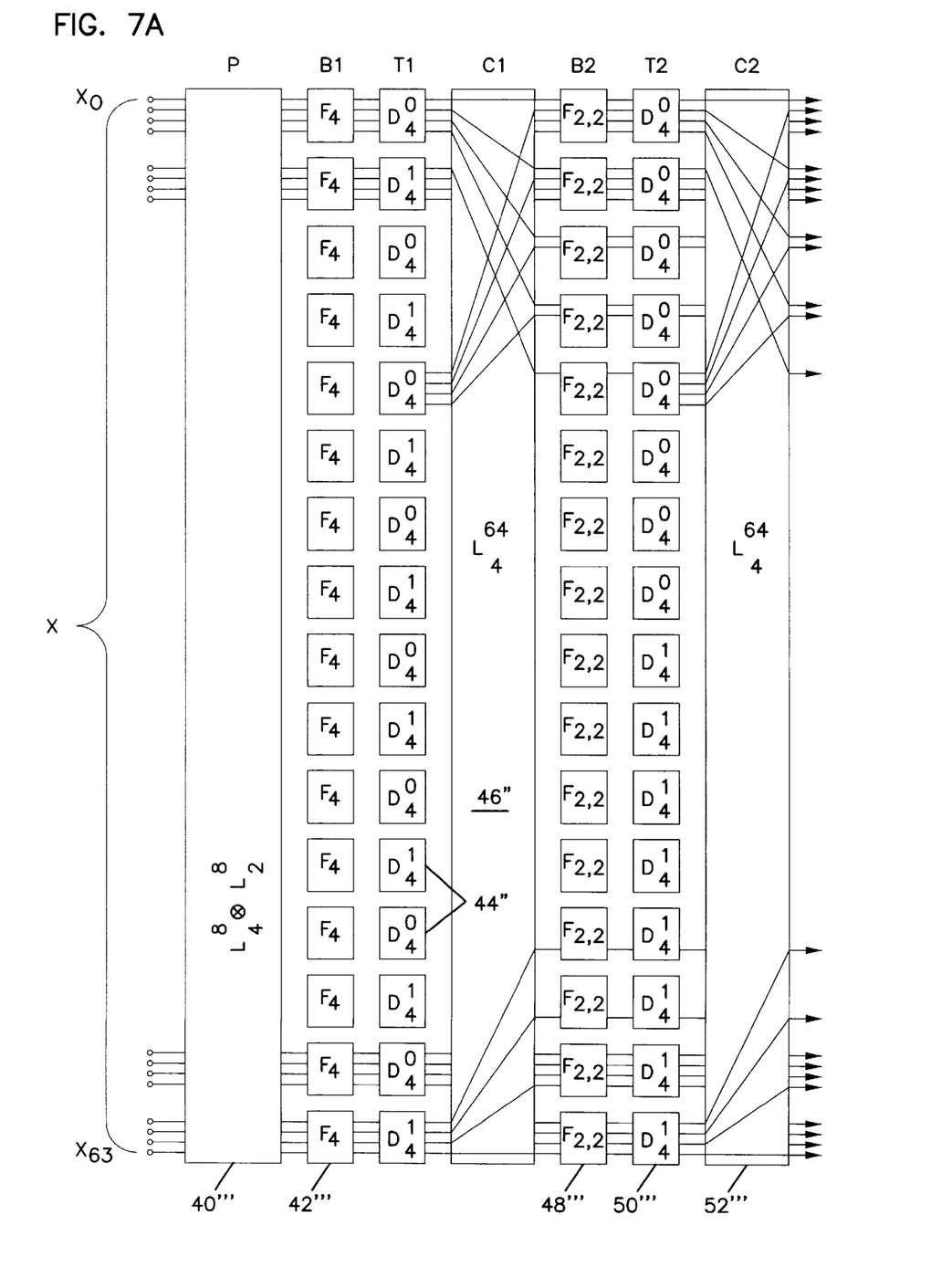
FIGS. 7A and 7B, illustrates the functional block diagram apparatus of FIG. 4 configured to compute a two-dimensional 8×8-point fast Fourier transform.
Figure 7B:
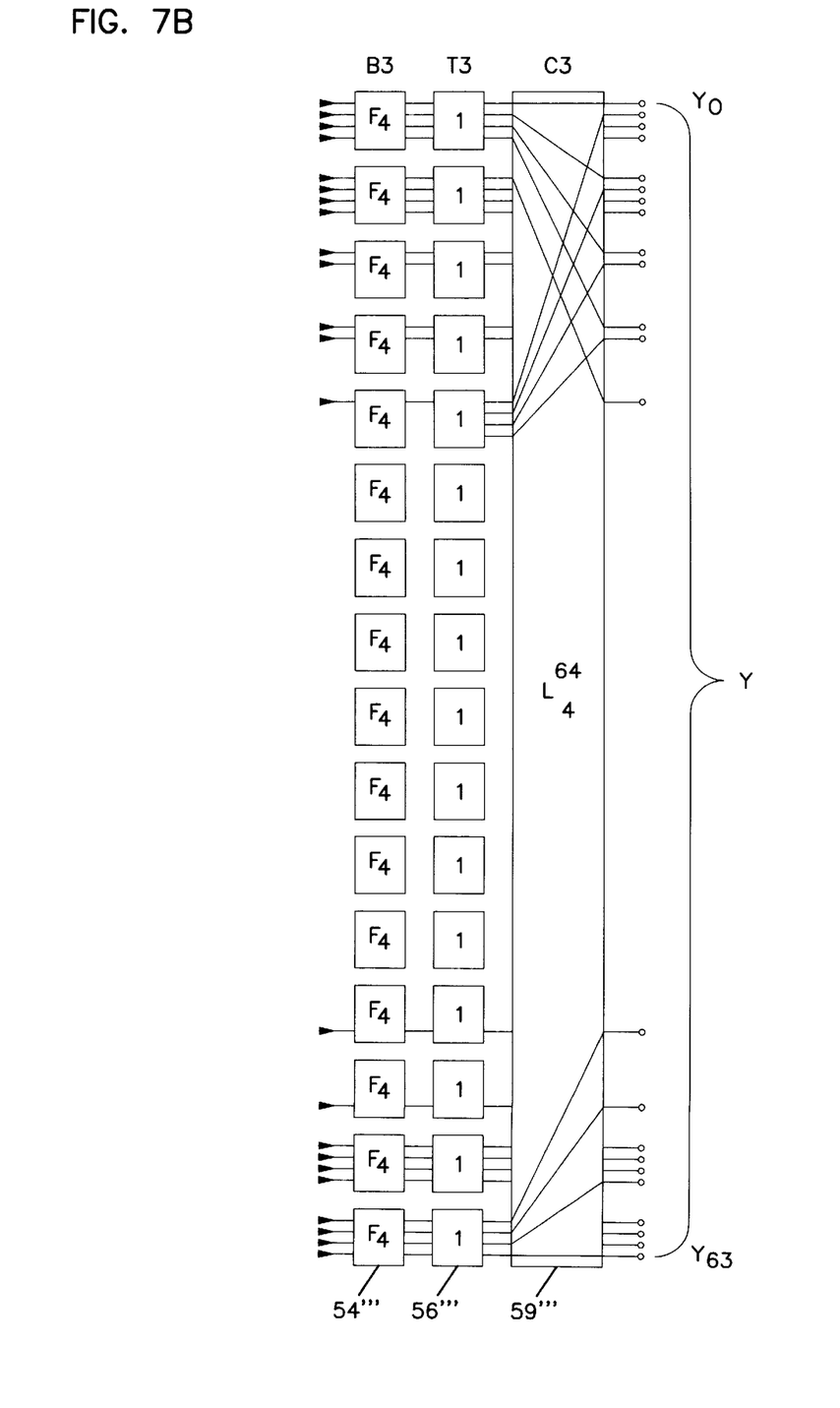

In FIG. 7, the FIG. 4 hardware configuration is configured for computation of the two-dimensional 8×8-point FFT of Equation 10. In the FIG. 7 configuration, the "P" functional block 40''' is configured to implement the permutation $L_4^8 \oplus L_2^8$. The "B" functional blocks 42''' and 54''' in the first and third stages equal the $F_4$ base size FT computation, and the "B" functional blocks 48''' of the second stage are reconfigured as the two-dimensional $F_{(2,2)}$ FT. The "T" twiddle factor functional blocks 44''' and 50''' contain non-trivial complex multiplications in the first and second BTC stages as indicated in the respective T functional blocks in FIG. 7, according to the following key, where tau is a primitive 8th root of unity:

(a) $D_4^0 = 1,1,1,1$
(b) $D_4^1 = 1,\tau,\tau^2,\tau^3$.

From the foregoing descriptions and illustrations related to FIGS. 4–7 it will be appreciated that once the C-T FFT algorithm is presented in "dimensionless" format, the same architectural hardware can be used for computing either one-, two- or three-dimensional FFTs based on any particular number of points for that FFT. A simple reconfiguration of the individual computational blocks of the architectural network provides for rapid conversion of the hardware for accommodating calculation in any of the three dimensions. While configuration of computing hardware has been shown as one embodiment for implementing the invention, it will be appreciated by those skilled in the art that by appropriate programming of a computer, the same computational results can be accomplished by software programming techniques. Such software configuration of a computing apparatus, such as a digital computer, is included within the scope of this invention.

From the foregoing, it will be appreciated that a unique method and apparatus for computing FFTs that enables rapid evaluation and computation of FFTs regardless of their dimension have been disclosed. While the invention has been described with respect to particular preferred embodiments thereof and with respect to examples for implementation of specific FFTs, it will be understood by those skilled in the art that the invention is not to be limited in any manner by the specifics of the preferred embodiments or hardware architectures described or to its application in implementing only those FFTs described in the preferred embodiments. Further, while the invention has been described primarily with respect to preferred embodiments for implementing the invention in apparatus or hardware, the invention also includes software configurations for computing FFTs based on the dimensionless FFT formulation and algorithms presented in this invention. The preferred embodiments have been described to illustrate clear examples of how the principles of this invention can be specifically applied to the rapid evaluation and computing of FFTs. Those skilled in the art will readily appreciate the immensity of the practical applications for and variations of this invention to other use applications. All alternatives and modifications of the foregoing are intended to be covered within the broad scope of the appended claims.

We claim:

1. A method for computing one-, two- or three-dimension FFTs comprising the steps of:
   a. selecting a FFT to be computed, said FFT having a known size;
   b. formatting said FFT in dimensionless format; and
   c. implementing said dimensionless formatted FFT for computation by a computing apparatus, wherein said implementation enables said FFT and its other dimensional equivalents to be calculated using the same basic implementation.

2. The method of claim 1, wherein the step of implementing said dimensionless formatted FFT comprises configuring digital hardware for computing said FFT.

3. The method of claim 2, wherein at least a part of said hardware is reconfigurable, and including the step of reconfiguring said reconfigurable part of said hardware.

4. The method of claim 3, further including the steps of:
a. computing a portion of said dimensionless formatted FFT through a first computation stage;
b. electronically reconfiguring said hardware after completion of said first computation stage;
c. computing a second portion of said dimensionless formatted FFT on said reconfigured part of said hardware through a second computation stage; and
d. repeating said reconfiguring and said computation steps through successive computation stages until the entire dimensionless formatted FFT is computed.

5. The method of claim 2 including the steps of:
a. computing said dimensionless formatted FFT with said digital hardware; and
b. deriving a computed output from said digital hardware representing the computation of said selected FFT.

6. The method of claim 1, wherein the step of implementing said dimensionless FFT comprises configuring software operable on a digital computer for computing said dimensionless formatted FFT.

7. The method of claim 6, including the step of computing said selected FFT by running said software on a digital computer.

8. The method of claim 1, wherein said step of formatting said FFT includes using tensor product techniques.

9. The method of claim 8, wherein the formatting step includes factoring the selected FFT to include the following factors:
a. a first permutation;
b. at least one dimensionless Fourier transform of a base size;
c. at least one twiddle factor multiplication by a complex number or numbers; and
d. at least one load-stride permutation.

10. The method of claim 9, wherein said implementation step includes permuting input data representing said FFT by means of said first permutation.

11. The method of claim 9, wherein said implementing step comprises processing input data representing said FFT through a number of successive processing steps, and wherein said processed data is permuted by said load-stride permutation between said processing steps.

12. A method for computing one-, two- or three-dimension FFTs comprising the steps of:
a. selecting a FFT to be computed, said FFT having a known size;
b. formatting said FFT in dimensionless format; and
c. computing said dimensionless formatted FFT on a computing apparatus, without regard to dimension.

13. A method of designing computing hardware to evaluate dimensionless FFTs comprising the steps of:
a. selecting a FFT that has been formatted in dimensionless format, to be evaluated; and
b. implementing said dimensionless formatted FFT for computation by a computing apparatus, wherein said implementation enables said FFT in any dimension to be calculated using the same basic implementation of said computing apparatus.

14. A method of computing data representing a FFT of size n, comprising:
a. inputting said data into a digital computing device;
b. permuting said data;
c. processing said data through a first computation stage comprising a tensor product of a dimensionless Fourier transform of base size m, where m is less than or equal to n, and a first twiddle factor; and
d. permuting the product of said first computation stage, to provide first stage output data.

15. The method of claim 14, further comprising:
a. processing said first stage output data through a second computation stage comprising a tensor product of said dimensionless Fourier transform of base size m and a second twiddle factor; and
b. permuting the product of said second computation stage to provide second stage output data.

16. The method of claim 15, including the steps of:
a. programmably reconfiguring hardware of said first computation stage after said first stage output data is obtained; and
b. using said reconfigured hardware as said second computation stage.

17. A computing apparatus for computing input data representative of a FFT of size n, comprising:
a. input permutation digital circuits for permuting said input data; and
b. stage processing digital circuits for successively multiplying tensor products of a base size Fourier transform and a twiddle factor, and permuting the multiplied product according to a dimensionless FFT format.

18. The computing apparatus of claim 17, further including reconfiguring means for reconfiguring at least a portion of said stage processing digital circuits between successive multiplying steps during the computation of any one said FFT of size n.

19. The computing apparatus of claim 18, wherein the same input permutation digital circuits and stage processing digital circuits can be used for computing one-, two- or three-dimensional equivalents of said FFT of size n.

20. The computing apparatus of claim 17, wherein the same input permutation digital circuits and stage processing digital circuits can be used for computing one-, two- or three-dimensional equivalents of said FFT of size n.

21. The computing apparatus of claim 17, further including input reconfiguring means for reconfiguring said input permutation digital circuits to accommodate different equivalent dimensional configurations of said FFT of size n.

22. The computing apparatus of claim 17, wherein said stage processing digital circuits include circuit means for permuting said multiplied product according to load-stride permutations.

23. The computing apparatus of claim 17 wherein said input permutation digital circuits and said stage processing digital circuits are semiconductor chips.

24. The computing apparatus of claim 17 wherein said input permutation digital circuits and said stage processing digital circuits are part of a digital computer.

25. A computer-implemented method for evaluating a FFT of size n, comprising the steps of:
a. deriving a dimensionless FFT model of said FFT using a tensor-product formulation technique; and
b. using said dimensionless FFT model on data streams representing a specific FFT of size n to evaluate said data streams.

* * * * *